US005602906A

United States Patent [19]

Phelps

[11] Patent Number: 5,602,906
[45] Date of Patent: Feb. 11, 1997

[54] TOLL FRAUD DETECTION SYSTEM

[75] Inventor: James W. Phelps, Roeland Park, Kans.

[73] Assignee: Sprint Communications Company L.P., Kansas City, Mo.

[21] Appl. No.: 56,246

[22] Filed: Apr. 30, 1993

[51] Int. Cl.⁶ .......................... H04M 15/00; H04M 3/00
[52] U.S. Cl. ..................... 379/114; 379/196; 379/197
[58] Field of Search .................... 379/114, 118, 379/144, 145, 188, 189, 91, 196

[56] References Cited

U.S. PATENT DOCUMENTS 4,706,275  11/1987  Kamil .
4,893,330  1/1990   Franco ............................. 379/189 X
5,163,086  11/1992  Ahearn et al. ..................... 379/91
5,357,564  10/1994  Gupta et al. ...................... 379/188
5,365,580  11/1994  Morisaki .......................... 379/189

*Primary Examiner*—Wellington Chin
*Assistant Examiner*—Paul Loomis
*Attorney, Agent, or Firm*—Harley R. Ball; Michael J. Setter

[57] ABSTRACT

In a telecommunications network, a toll fraud detection system analyzes call placement information concerning toll calls placed using billing numbers for unauthorized use of billing numbers. In the preferred embodiment, a set of artificial intelligence rules operate on the placement information to develop an indication that the use of a particular billing number is unauthorized.

15 Claims, 2 Drawing Sheets

TOLL FRAUD DETECTION SYSTEM

BACKGROUND OF THE INVENTION

1. Field of the Invention

The present invention relates to the field of telecommunications. More particularly, the invention is concerned with a detection system that analyzes call placement information concerning toll calls for detecting unauthorized use of billing numbers. In the preferred embodiment, a set of artificial intelligence rules operate on the call placement information to develop an indication that the use of a particular billing number is unauthorized.

2. Description of the Prior Art

In the field of telecommunications toll fraud, it is important to have advanced toll fraud prevention techniques. Prevention is especially important when the unauthorized use is for international calls because the interexchange carrier handling the call may have to transfer payments to the destination telephone company, even if the toll charge is uncollectible.

In response, interexchange carriers have instituted various toll fraud prevention schemes which are only partially successful, as illustrated by the fact that interexchange carriers will not place toll calls using a billing number to certain countries. Additionally, these schemes also prevent legitimate billing number calls and represent a loss of potential revenue to the carriers.

SUMMARY OF THE INVENTION

The toll fraud detection system of the present invention solves the prior art problems discussed above and provides a distinct advance in the state of the art. More particularly, the invention hereof provides a rapid and highly accurate means for detecting unauthorized use of billing numbers, and for preventing further unauthorized use.

In the preferred embodiment, computers are provided with call placement information concerning toll calls placed over the network using billing numbers. In addition, those computers contain history information of previous unauthorized uses of billing numbers associated with the placement information. The call placement and history information are analyzed according to predetermined criteria to develop an indication that the toll call has been placed with unauthorized usage of the billing number.

In particular forms, the criteria includes a set of expert system rules developed from actual, detected uses of unauthorized billing numbers. These rules are then applied to the call placement and history information to develop the indication of unauthorized use. The indications are cases that are generated from alerts and assigned a priority. With a sufficiently high priority, the billing number is automatically deactivated. In lower priority situations all of the pertinent data are provided to a researcher who determines the appropriate action. The history information is then updated in response to the action taken for a particular indication of unauthorized usage.

DETAILED DESCRIPTION OF THE PREFERRED EMBODIMENT

Figure 1:
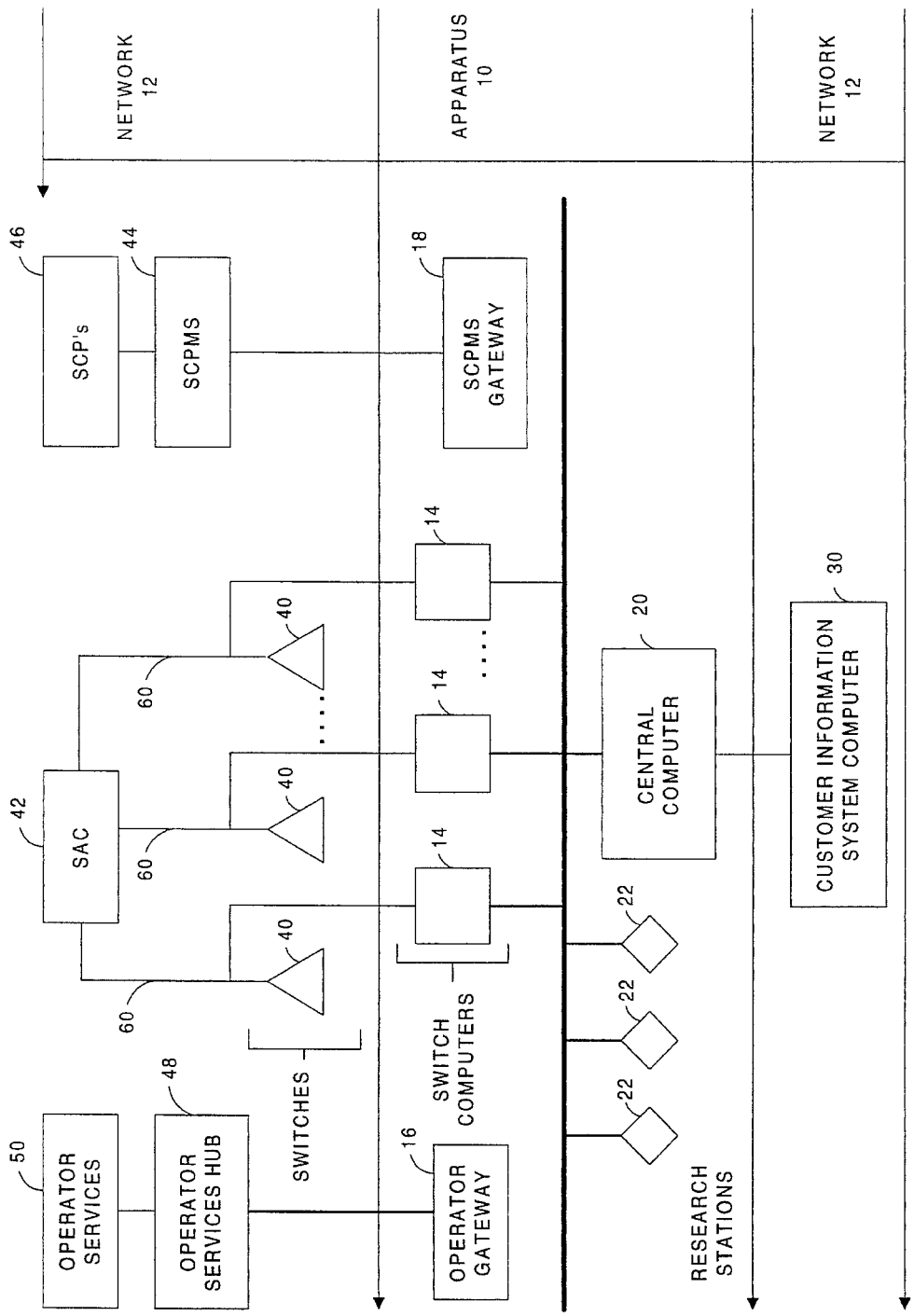
FIG. 1 is a block diagram of a telecommunications network coupled with the apparatus of the present invention.

FIG. 1 illustrates apparatus 10 operably coupled with telecommunications network 12. Apparatus 10 includes a plurality of switch computers 14 (Symbolics 3620), operator gateway 16 (Symbolics XL1200), and service control point management system gateway 18 (SCPMS gateway) (Symbolics 3620)—all operably coupled with central computer 20 (Symbolics XL1200). Apparatus 10 further includes a plurality of research stations 22 (X-terminals) operably coupled with central computer 20. In the preferred embodiment, the coupling of these components is accomplished with ethernet LAN 24.

Network 12 includes: switches 40, (Northern Telecom DMS 250), site administrative computer 42 (SAC) (Tandem CLX), service control point management system 44 (SCPMS), service control points 46 (SCPs), operator services hub 48, and operator services 50. SCPMS gateway 18 is coupled to SCPMS 44 which is, in turn, connected to SCPs 46. Operator gateway 16 is coupled to operator services hub 48 which is, in turn, connected to operator services 50. Central computer 20 is connected to customer information system computer 30 (IBM 3090) which is used by the network.

Each switch computer 14 is coupled to respective X.25 link 60 between respective switch 40 and SAC 42. Link 60 transmits the call detail record (CDR) of each call processed by the associated switch 40. These CDRs are provided to switch computers 14 by the coupling to link 60.

Apparatus 10 receives call placement information and customer information from network 12. This information is used to update the history information stored in apparatus 10. Apparatus 10 generates an indication of unauthorized use of a billing number by applying the call placement and history information to a set of expert system rules. The indication is a case that is generated from an alert and assigned a priority. The case is resolved by a set of expert system rules or a researcher, and network 12 acts on the resolution.

Figure 2:
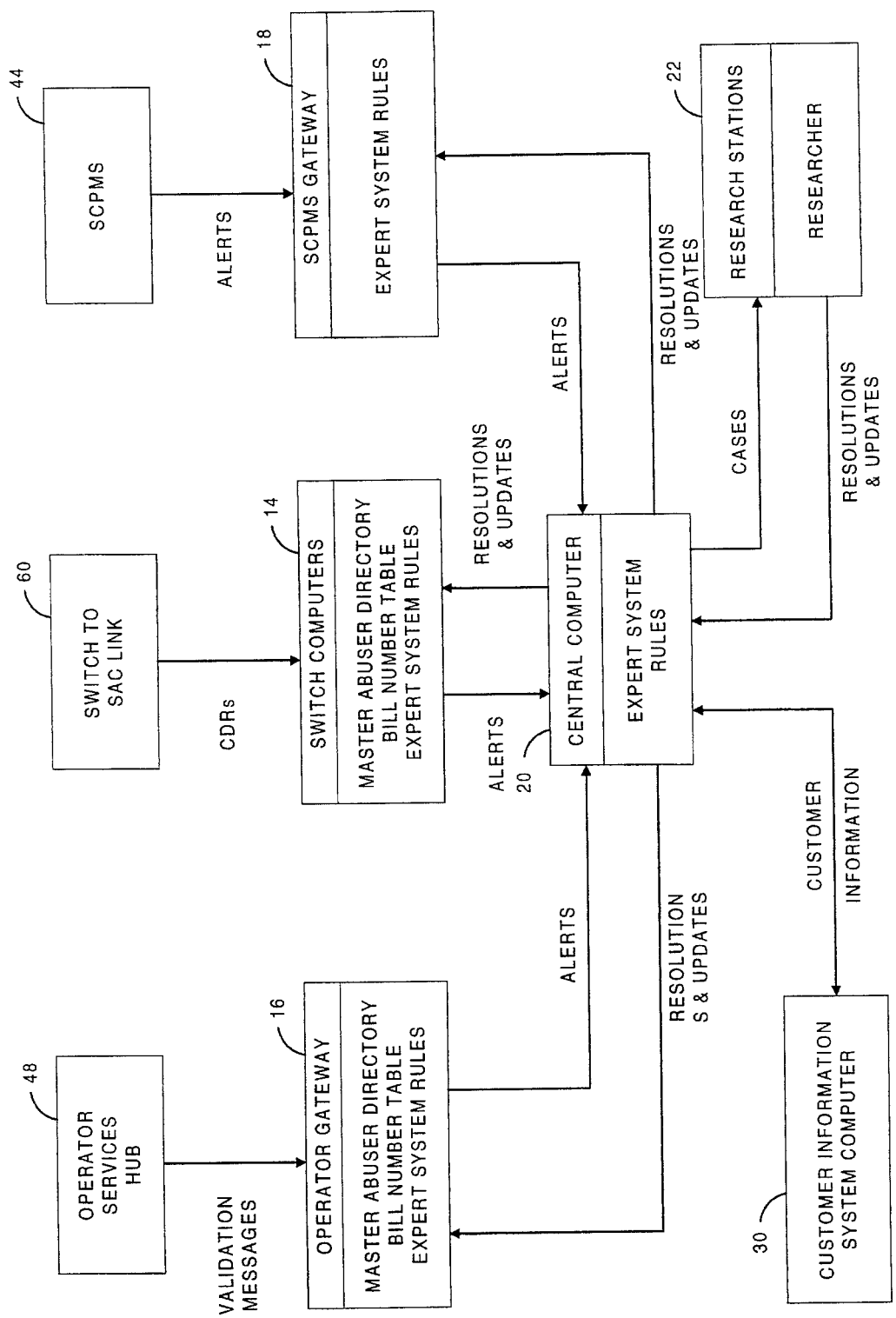
FIG. 2 is a diagram of the operation of the present invention.

FIG. 2 in combination with FIG. 1 illustrates the method of operation of apparatus 10. Switch computers 14 receive CDRs from the coupling to links 60. As those skilled in the art appreciate, the CDR includes all of the necessary billing information including origination and termination telephone numbers, start and stop times, call duration, and type of billing. The type of billing includes whether the call was placed by direct distance dialing or by use of a billing number such as credit card and type (e.g. Visa), collect call, third party number, an interexchange carrier (IXC) calling card such as a FONcard, or a local exchange carrier (LEC) calling card. The CDR information received by switch computers 14 from link 60 includes data concerning direct distance dialed calls. These are not of interest in the preferred embodiment of apparatus 10 which is concerned with detecting unauthorized usage of billing numbers. Thus, each switch computer 14 is configured to delete the CDR information concerning direct distance dialed calls. Each switch computer 14 also analyzes the CDRs based on a set of expert system rules for the detection of fraudulent call activity, and generates alerts based on the CDRs to send to central computer 20 for further analysis.

SCPMS 44 processes call attempt information and produces alerts that are provided to SCPMS gateway 18. These alerts are generated for LEC and IXC calling cards only when the number of attempts to use a calling card exceeds a predetermined threshold. The threshold is dependant in part on the type of product and the geographic dispersion of the call origination points. SCPMS gateway 18 analyzes the alerts based on a set of expert system rules for the detection of fraudulent call activity, and generates alerts based on the SCPMS alerts to send to central computer 20 for further analysis.

Operator services 50 handle collect, credit card, or third party number calls. The operator transmits billing number information to a network data base for validation before completion of the toll call. This process produces validation messages which are provided to operator gateway 16 through operator services hub 48. Operator gateway 16 analyzes the validation messages with a set of expert system rules, and any consequent alerts of possible fraudulent activity are transmitted to central computer 20 in real time before call placement has occurred. Validation messages include the originating and terminating phone number, the type of originating phone, the type of billing method used, and the validation reply code showing the result from the validation computers.

Switch computers 14 and operator gateway 16 include associated memory in which two primary databases are stored. These include the master abuser directory and the bill number table which are used along with the expert system rules to generate alerts.

The master abuser directory contains a history of previous indications of unauthorized usages of billing numbers indexed by originating number and terminating number. More particularly, if an originating number or terminating number has been previously indicated as being associated with unauthorized use of a billing number, then that number is stored in memory in association with pertinent information concerning the unauthorized use.

For an originating telephone number, the pertinent information includes the following: the number of abused calls, the total minutes of abused calls, the number of international calls and number of minutes, a list of abused billing numbers, the terminating telephone numbers to which the calls were placed, the number of different types of billing numbers used, the date of the most recent abused call, the number of cases resulting in billing number deactivation, and the number of cases not resulting in deactivation (false alarms).

For a terminating number, the pertinent information further includes the NPA of the terminating country along with the name of the terminating city and state, and a list of originating numbers.

The master abuser directory also contains lists of previously misused billing numbers in association with the respective origination or terminating telephone numbers. The master abuser directory is updated by case resolution and manual entry.

The bill number table includes the following information: the call disconnect time of the most recent call and of the current call, and the number of calls, conversation seconds, international seconds, different originating telephone numbers, overlapping calls, pay phone calls, and the CDR for all of the calls. The bill number tables are updated in real time by switch computers 14 and operator gateway 16.

As discussed above, central computer 20 receives alerts of possible fraudulent activity from switch computers 14, SCPMS gateway 18, and operator gateway 16. Central computer 20 processes these alerts along with other database inputs from customer information system computer 30. The processing is executed according to a set of expert system rules which produces a case that unauthorized use of a billing number may have occurred in placing a toll call.

The cases are assigned priority levels according to the likelihood that the billing number usage is unauthorized. In the highest priority situation, central computer 20 broadcasts resolutions to operator gateway 16 SCPMS gateway 18 or switch computers 14 which generate blocks that automatically deactivate the billing number and updates the customer information system computer 30. Accordingly, all of the cases not automatically deactivated are forwarded by central computer 20 in priority order to research stations 22 for resolution by a researcher. These resolutions are broadcast and blocks may result in the manner stated above.

The information obtained by central computer 20 from customer information system computer 30 contains behavior information indicative of the usage characteristics of individual customers indexed by originating telephone number, terminating telephone number, and billing number. The behavior information has been identified as salient for identifying toll fraud and includes the following: simultaneous usage of the same billing number, and the number of calls made per unit time, minutes of conversation, international calls made, international minutes, reoriginated and conference calls, different types of billing numbers used from or to a particular phone, payment history, prior disputes, comments, and the likelihood of abuse for the given originating and terminating telephone numbers as stored in the master abuser directory. Additionally, the behavior information includes the different originating and terminating numbers used and the number and time of different types of telephones used.

Central computer 20 builds cases of fraud based on the evidence it receives; namely, call placement information as CDR alerts from switch computers 14, SCPMS based alerts from SCPMS gateway 18, and validation message alerts from operator gateway 16. The incoming evidence is stored in a first-in, first-out queue whereupon the first alert is used to update the behavior characteristics in customer information system computer 30. Next, the pertinent history information is retrieved from customer information system computer 30. Central computer 20 then uses the expert system rules to analyze the call placement information and the history information.

The expert system rules are configured empirically on the basis of actual cases of unauthorized billing number usages. With this approach, the rules can be continuously updated and refined to reflect learning experiences concerning newly detected cases of toll fraud, and customized for each type of billing number. Thus, those skilled in the art will appreciate that the rules are not fixed, but are continuously evolving in order to adapt to the most current conditions.

In general, the rules are configured in four main types—those dealing with velocity, i.e., frequency of call placement, those concerned with the time duration of calls, multiple usage, and previous abuse experience for the given originating and terminating phone number. For LEC and IXC calling cards, the inputs for the velocity rules are the SCPMS based alerts from SCPMS gateway 18, which are generated in response to the number of call placements for a particular calling card exceeding a predetermined threshold. The CDRs used by switch computers 14 provide the input for the duration and multiple usage type rules for LEC and IXC calling cards. Telephone number information from both the CDR and the validation messages are checked against the master abuser directory in switch computers 14 and operator gateway 16 for identifying calls to and/or from previously abused phones.

For credit cards, collect calls and third party billto numbers, the validation messages used by operator gateway 16 provide the primary input in real time for the velocity rules. For all types of billing numbers, the CDR data are analyzed after call completion and provide duration and time information.

The rules are applied to the call placement information in view of the history information from the master abuse directory and the bill number table to produce an indication of toll fraud or abuse, i.e., unauthorized usage of a billing number. If such an indication is present, an alert is produced and assigned a priority level according to the rule derived likelihood that toll fraud has occurred. The alerts and all the pertinent data are gathered into central computer 20 where cases are generated, available customer information is collected from customer information system computer 30, and cases are presented to a researcher at research station 22 depending on the priority. In the preferred embodiment, the assignment of a first priority results in automatic deactivation of the associated billing number. Assignment of a lower priority requires action by a researcher before deactivation.

The velocity rules determine whether the number of calls placed using a particular billing number and type exceed a predetermined threshold in a given time frame. For LEC and IXC calling cards, the SCPMS alerts inherently provide this determination. For the other types of billing numbers this is determined from the validation messages or the CDR. For some types of LEC calling cards, the generation of a SCPMS alert is sufficient for first priority assignment. For other types of billing numbers, additional factors determine the priority. These other factors include such things as whether the call was placed from or terminated to a designated "hot" number, switch, country or NPA for any billing number, the term "hot" meaning that substantial previous toll fraud has been detected in association with a particular designation, as indicated in the master abuser directory.

The duration rules analyze for calls exceeding individually predefined threshold times to or from specified hot originating or terminating numbers, switches, countries, or NPA areas, or exceeding longer threshold times to other countries or placed from non-hot phones. The duration rules also analyze for re-originated calls from a hot or conference phone, or for any call originating from and terminating to telephone numbers previously involved with toll fraud. In general, the threshold times in connection with the various factors determines the priority assigned to an alert.

The multiple usage rules analyze whether simultaneous multiple calls are occurring using the same billing number. Often this is a strong indication of toll fraud particularly with credit cards or calling cards. A priority level is assigned depending upon the number of simultaneous or overlapping calls using the same billing number.

The previous abuse rules based on origination and termination information, such as individual phone numbers, determine part of the alert priority from the probability that calls from, to, or in combination, have been associated with fraudulent activity. This information is stored in the master abuser directory which receives real time feedback of fraud activity based on actual resolution of cases and verified claims call analysis.

When a case is generated, the pertinent information is delivered to one of research stations 22 for analysis in priority order. Analysis occurs even for first priority alerts for which the billing number has already been deactivated so that a researcher can determine if the action was appropriate. The information presented to the researcher includes all of the information needed for further determination. This includes the details of the particular case and the history information from the master abuser directory.

Additionally, the researcher is presented with the behavior information from customer information system computer 30. This is helpful in determining whether the placement information is out of character for that particular customer. For example, a case may have been generated because an international call exceeded a predetermined time duration, or because the number of international calls using the same calling card exceeded a rule threshold. By looking at the customer information the researcher may determine that such a level of international calling is not abnormal for this particular customer or billing number.

In other circumstances, this level of international calling may be out of character, providing a strong indication that toll fraud may have occurred. In this situation, the researcher may call the customer to verify the legitimacy of the calls. The researcher may also consider the customer's payment history in deciding whether to deactivate a billing number.

After an analysis by the researcher has been completed, the researcher decides whether to deactivate a billing number, or to unblock a billing number that may have been automatically blocked with assignment of a first priority level. The researcher then enters this decision into the network.

The researcher's analysis and action taken are entered as immediate feedback to the master abuser directory in order to provide probability measurements of the likelihood that calls to, from, or in combination for a set of telephone numbers are being fraudulently made. For example, if the analysis indicates that toll fraud has occurred, this information is important and by updating the master abuser directory with this information, the reliability of analysis is improved. Additionally, the rules can also be updated and refined both on the basis of actual toll fraud and false alerts.

Those skilled in the art will appreciate that the present invention encompasses many variations in the preferred embodiment described herein.

Having thus described the preferred embodiment of the present invention, the following is claimed as new and desired to be secured by Letters Patent:

1. A method for detecting fraudulent calls in a telecommunications network wherein the network is operable for handling calls from origination telephone numbers to termination telephone numbers using billing numbers, the method comprising:

receiving call information into a computer system wherein the call information comprises at least an origination number, a termination number, and a billing number for a particular call;

storing history information in the computer system wherein the history information is related to previous fraudulent calls and comprises a least the origination numbers, the destination numbers, and the billing numbers for the previous fraudulent calls;

analyzing the call information and the history information in the computer system according to a set of rules to develop a priority indicating a likelihood that the billing number for the particular call has been fraudulently used, wherein the set of rules comprises comparing the origination number, the termination number, and the billing number for the particular call to the originating numbers, the terminating numbers, and the billing numbers of the previous fraudulent calls.

2. The method of claim 1, further including the step of indexing the history information by originating number, by terminating number, and by billing number.

3. The method of claim 1 further comprising updating the history information with information from subsequent fraudulent calls.

4. The method of claim 1 wherein the set of rules further comprises comparing the duration of the particular call to a pre-determined time period.

5. The method of claim 1 wherein the set of rules further comprises determining if the billing number of the particular call is being used simultaneously.

6. The method of claim 1 wherein the set of rules further comprises comparing the number of calls using the billing number of the particular call over a time period to a threshold number of calls for the time period.

7. The method of claim 1 further comprising generating a report in response to an indication wherein the report incorporates the call information and history information associated with the call information.

8. A method for detecting fraudulent calls in a telecommunications network wherein the network is operable for handling calls from origination telephone numbers to termination telephone numbers using billing numbers, the method comprising:

receiving call information into a computer system wherein the call information comprises at least an origination number, a termination number, and a billing number for a particular call;

storing history information related to previous fraudulent calls in the computer system;

analyzing the call information and the history information in the computer system according to a set of rules derived from previous fraudulent calls to develop a priority indicating a likelihood that the particular call was fraudulent.

9. A system for detecting fraudulent calls in a telecommunications network wherein the network is operable for handling calls from origination telephone numbers to termination telephone numbers using the billing numbers, the system comprising:

a first computer means for receiving call information that comprises at least an origination number, a termination number, and a billing number for a particular call;

a second computer means for storing history information that is related to previous fraudulent calls;

a third computer means associated with the first and second computer means for analyzing the call information and the history information according to a set of rules derived from previous fraudulent usage to develop a priority indicating a likelihood that the particular call is fraudulent.

10. The system of claim 9 wherein the second computer means is for storing at least originating numbers, terminating numbers, and billing numbers for previous fraudulent calls.

11. The system of claim 9 wherein the third computer means is for comparing the duration of the particular call to a pre-determined time period.

12. The system of claim 9 wherein the third computer means is for comparing the number of calls using the billing number of the particular call over a time period to a threshold number of calls for the time period.

13. The system of claim 9 wherein the third computer means is for generating a report in response to an indication wherein the report incorporates the call information and history information associated with the call information.

14. A method for detecting fraudulent calls in a telecommunications network wherein the network is operable for handling calls from origination telephone numbers to termination telephone numbers using billing numbers, the method comprising:

receiving call information into a computer system wherein the call information comprises at least an origination number, a termination number, and a billing number for a particular call;

storing history information in the computer system wherein the history information is related to previous fraudulent calls and comprises a least the origination numbers, the destination numbers, and the billing numbers for the previous fraudulent calls;

analyzing the call information and the history information in the computer system according to a set of rules to develop an indication that the billing number for the particular call has been fraudulently used, wherein the set of rules comprises determining if the billing number of the particular call is being used simultaneously and comparing the origination number, the termination number, and the billing number for the particular call to the originating numbers, the terminating numbers, and the billing numbers of the previous fraudulent calls.

15. A system for detecting fraudulent calls in a telecommunications network wherein the network is operable for handling calls from origination telephone numbers to termination telephone numbers using the billing numbers, the system comprising:

a first computer means for receiving call information that comprises at least an origination number, a termination number, and a billing number for a particular call;

a second computer means for storing history information that is related to previous fraudulent calls;

a third computer means associated with the first and second computer means for determining if the billing number for the particular call is being used simultaneously and for analyzing the call information and the history information according to a set of rules derived from previous fraudulent usage to develop a priority indicating a likelihood that the particular call is fraudulent.

* * * * *